April 22, 1924.

C. D. PAGE

VEHICLE SIGNAL

Filed Jan. 10, 1923   4 Sheets-Sheet 1

1,491,164

Inventor.
Caleb D. Page
by Heard Smith & Tennant
Attys.

April 22, 1924.  
C. D. PAGE  
VEHICLE SIGNAL  
Filed Jan. 10, 1923  
1,491,164  
4 Sheets-Sheet 2
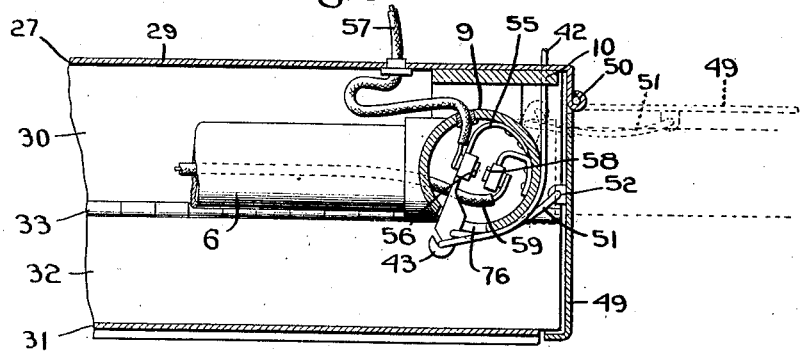
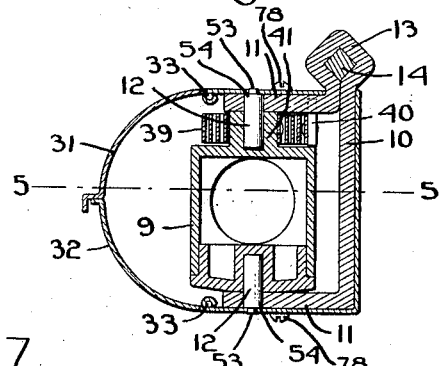
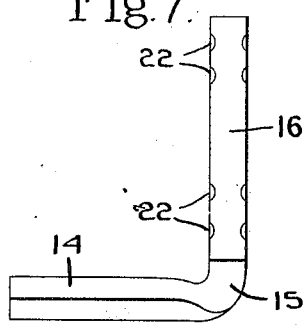
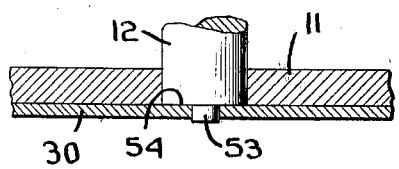
Inventor.  
Caleb D. Page  
by Heard Smith & Tennant  
Attys.

April 22, 1924.

C. D. PAGE 1,491,164

VEHICLE SIGNAL

Filed Jan. 10, 1923    4 Sheets-Sheet 3

Inventor.
Caleb D. Page
by Heard Smith & Tennant.
Attys.

April 22, 1924.

C. D. PAGE

VEHICLE SIGNAL

Filed Jan. 10, 1923     4 Sheets-Sheet 4

1,491,164

Inventor.
Caleb D. Page
by Head Smith & Tennant.
Attys

Patented Apr. 22, 1924.

1,491,164

UNITED STATES PATENT OFFICE.

CALEB D. PAGE, OF GREELEY, COLORADO.

VEHICLE SIGNAL.

Application filed January 10, 1923. Serial No. 611,879.

*To all whom it may concern:*

Be it known that I, CALEB D. PAGE, a citizen of the United States, and resident of Greeley, county of Weld, State of Colorado, have invented an Improvement in Vehicle Signals, of which the following description, in connection with the accompanying drawing, is a specification, like characters on the drawing representing like parts.

This invention relates to vehicle signals and particularly to that type of signal involving a swinging signal arm which is normally held in inoperative position but is adapted to be swung into an operative position for the purpose of indicating to other people the intention of the driver of the vehicle as regards stopping or turning to the right or left.

The device is particularly applicable for use on automobiles but is also capable of use on other vehicles.

One of the features of the present invention relates to a novel housing for the signal and in which said arm is concealed when it is not to be displayed. My improved housing is constructed to be opened or shut and is so arranged that when the signal arm is to be displayed the housing is first opened to permit the signal arm to pass out from it after which said signal arm is swung from its inoperative to its operative or signalling position. This arrangement by which the housing is opened when the signal arm is to be displayed has the advantage that the opening of the housing produces a movement which is in addition to the movement of the signalling arm from its operative to its signalling position and such movement of the housing calls the attention of the observer to the signal so that he the more readily sees and observes the movement of the signal arm.

This invention has special advantages when used in connection with a signal arm that is adapted to indicate the direction in which the driver intends to drive the vehicle, (which type of signal arm may conveniently be referred to as a direction-indicating arm) because when the signal arm is in inoperative position it is entirely enclosed within the housing and is thus concealed from view so that no one can make the mistake of thinking that it is indicating an intended movement on the part of the driver when it is in its inoperative position.

Another feature of my invention relates to a construction wherein the movement of the signal arm from its inoperative to its signalling position serves to open the housing for the signal to come out therefrom, and the movement of the signal arm from its signalling to its inoperative position serves to close the housing after the signal has entered the latter. The opening and closing of the housing, therefore, is accomplished automatically by the movement of the signal arm.

Other features of my invention relate to a novel way of securing the signal device to the wind shield of an automobile and to other constructional features all as will be more fully hereinafter set forth.

In order to give an understanding of my invention I have illustrated in the drawings a selected embodiment thereof which will now be described after which the novel features will be pointed out in the appended claims.

Fig. 5 is a section on the line 5—5, Fig. 6;

Fig. 6 is a section on the line 6—6, Fig. 2;

Fig. 7 is a view showing one form of hanger for supporting the signal device;

Fig. 8 is an enlarged sectional view showing the manner in which the top and bottom of the housing lock the pintles for the signal in the arms of the holder;

In order to illustrate the invention I have chosen to show it as it might be applied to an automobile, although as stated above it is equally applicable to other vehicles.

Figure 1:
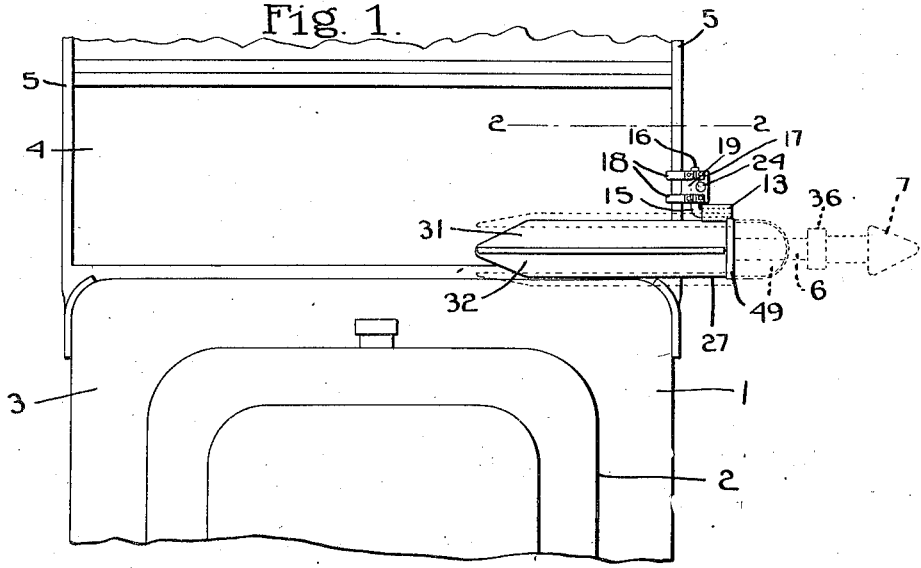
Fig. 1 is a fragmentary front view of an automobile showing my signal applied thereto.

In Fig. 1 I have shown at 1 in front view a portion of an automobile, 2 being the radiator, 3 the front portion of the body, 4 the wind shield and 5 the wind shield posts. These parts are or may be all as usual in automobiles and form no part of the present invention.

The signal comprises a signalling arm 6 which is pivotally mounted so that it may be swung from an inoperative position in which it is concealed from view to an exposed position, in which it projects outwardly from the vehicle body. The signal device may be placed in any desirable location on the vehicle and merely as illustrating one manner of installing the device I have shown it in the drawings as secured to one of the posts 5 of the wind shield and arranged so that the signal arm swings about a vertical axis from an inoperative position in front of the wind shield and at the lower edge thereof to an operative position extending laterally from the vehicle body, the latter position being shown in dotted lines in Fig. 1.

This signal arm 6 may have any suitable or usual construction and that herein illustrated is similar to the signal arm shown in my co-pending application Serial No. 464,541, April 26th, 1921. This signal arm has a translucent end 7 which encloses an electric light bulb 8, and means are provided whereby when the signal arm swings from its inoperative to its operative position the bulb 8 will be lighted.

A signal arm of this type simulates an arrow and when it is in its operative position shown in dotted lines Fig. 1 it has the effect of a pointer to indicate the intention of the operator to turn the vehicle in the direction in which the arm points. Such a signal arm has the function of a direction-indicating signal.

While I have illustrated the signal arm as placed on one side of the vehicle yet it will be obvious that it may be duplicated on the other side so that either signal arm may be operated dependent on the direction in which the vehicle is to be turned.

The signal arm is shown as extending from and supported by a hub member 9 which is pivotally mounted in a holder 10. This holder 10 may have any suitable or appropriate construction and the holder herein shown is made from heavy strap iron which is bent to form the two parallel arms 11 between which the hub 9 is pivoted by means of pintles 12. The holder herein shown is also formed with the loop 13 adapted to receive the horizontal arm 14 of an L-shaped hanger 15, the vertical arm 16 of said hanger being secured to a clamp 17 which is supported by the wind shield post 5. This clamp 17 is shown as comprising clamping jaws 18 adapted to engage opposite sides of the wind shield post 5 and connected by a strong U-shaped spring 19, which by its expansive action causes the jaws 18 to firmly grip the post 5. The clamp 17 is provided with one or more clips 20 adapted to receive the vertical arm 16 of the hanger 15, the arms of each clip being provided with clamping nuts 21 by which the said clip may be tightened to firmly grip the arm 16.

Figure 11:
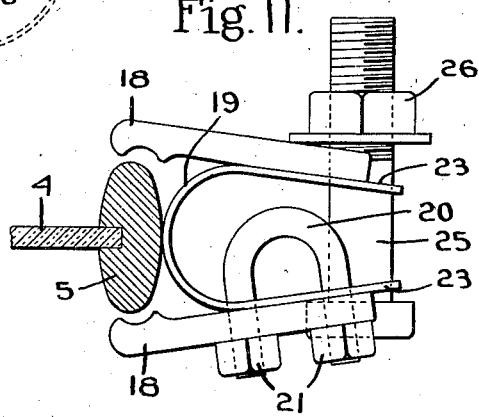
Fig. 11 is an enlarged view of a clamp which may be used for securing the signal to the wind shield post.

The arm 16 of the hanger may be provided with notches 22 to receive the clips 20 thereby more securely anchoring the hanger to the clamp. The clamp can be applied to or removed from the wind shield post 5 by forcing the ends 23 of the jaws toward each other, this operation spreading the clamping ends of the jaws. Inasmuch as the spring 19 will preferably be a relatively-stiff spring I have provided the ends 23 of the spring with apertures 24 through which a bolt 25 may be inserted as shown in Fig. 11 so that when the nut 26 of the bolt is turned up the ends 23 of the spring will be forced toward each other thus opening the clamp. After the clamp has been applied to the wind shield the bolt 25 may be removed and the spring 19 will then automatically cause the jaws 18 to grip the post 5. Other means for supporting the signal than that above described may, however, be used if desired.

Figure 2:
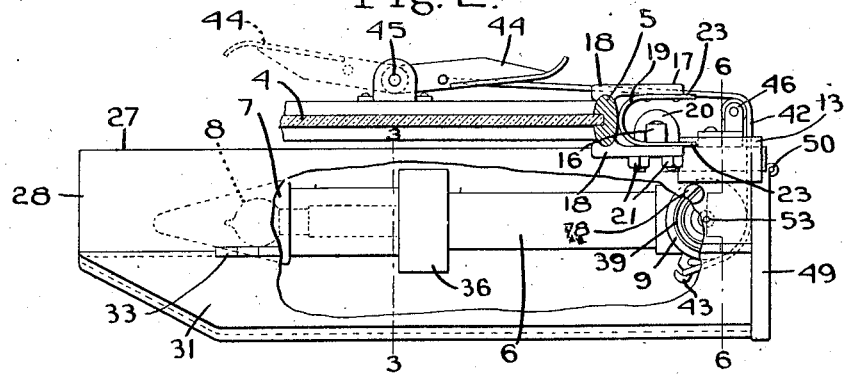
Fig. 2 is a section on the line 2—2, Fig. 1 looking down on the signal with a portion of the housing broken out.

The signal arm is acted upon by a suitable spring which normally holds it in its inoperative position and means under the control of the driver of the vehicle are provided for swinging the signal arm from its inoperative to its operative position. In Figs. 2 and 6 this spring is indicated at 39 and is a spiral spring secured at one end to one of the arms 11 as shown at 40 and at the other end secured to the boss 41 on the hub 9, said spring encircling the boss.

For swinging the arm from its inoperative to its operative position I have provided a flexible cord 42 which is connected at one end to an arm 43 extending from the hub 9, said cord passing to an actuating lever 44 situated within convenient reach of the operator of the vehicle. This lever 44 is pivoted to a bracket 45 and the connection between the flexible connection and the lever is such that when the lever is swung from the full to the dotted line position the cord will be drawn on thereby swinging the signal arm from its inoperative to its operative position.

In some installations it may be necessary to employ a direction pulley 46 to guide the flexible connection 42 from the hub 9 to the lever 44.

Means are herewith shown which cooperate with the lever 44 to hold the signal device in its operative position. The bracket 45 is provided with a locking shoulder 47 with which the lever 44 may have engagement when it is in its dotted line position. Said lever 44 is pivotally mounted on a bolt 74 and is acted on by a spring 75 which tends to press it upwardly in Fig. 4. This spring, however, allows the lever 44 to have a lateral movement sufficient to wipe over the shoulder 47 when the lever is thrown into dotted line position and it also permits the lever to be moved laterally to disengage it from the shoulder when it is to be released. In order to move the signal arm into its operative position, therefore, it is simply necessary for the operator to swing the lever 44 from the full to the dotted line position Fig. 4 and during this movement the lever will snap over the shoulder 47.

When the signal is to be returned to the housing the lever is pressed laterally to disengage it from the shoulder 47 when the spring 39 will function to swing the signal back into its inoperative position.

Associated with the signal arm 6 is a housing which can be opened and closed and within which the signal arm is concealed when said arm is in inoperative position, said housing being constructed to open when the arm is to be swung into its operative position shown in dotted lines Fig. 1 thus to permit said arm to pass out of the housing. The housing may have various constructions without departing from my invention. In the device shown in Figs. 1 to 5 said housing comprises a body portion 27 which is secured to the holder 10 by suitable screws 78 which has a top 28, a rear side 29 and a bottom 30 and which also has an opening at the front that is adapted to be closed by a suitable closure.

In Figs. 1 to 6 this closure comprises the two doors or leaves 31 and 32 which extend the length of the housing and are pivoted to the top and bottom as shown at 33. When the doors 31, 32 are closed, their edges meet thus entirely enclosing the open front of the housing and said doors are adapted to swing from the full to the dotted line position Fig. 3 thereby opening the housing to permit the signal arm to pass out therefrom.

These doors may be either opened by the signal arm as it moves outwardly or they may be constructed so that they will open automatically as the signal arm begins to move away from its inoperative position.

Figure 3:
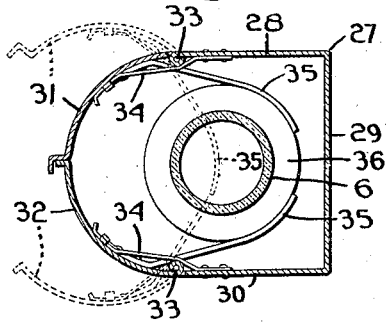
Fig. 3 is a section on the line 3—3, Fig. 2.

In the construction shown in Figs. 1 to 3 the doors are acted on by springs which tend to open them and they are held closed by the signal arm when it is in its inoperative position. Each door is shown as having a spring 34 associated therewith which tends normally to open the door and each door is also provided with an inwardly-extending arm 35 which is adapted to be engaged by a collar 36 on the signal arm when the latter is in its inoperative position as shown in Fig. 3.

The engagement of the signal arm with the arms 35 holds the doors 31 and 32 closed as shown in full lines Fig. 3. As soon as the signal arm starts to swing from its inoperative to its operative position thereby relieving the pressure of the collar against the arms 35, the springs 34 act to open the doors as the signal arm moves, thus opening the side of the housing to permit the signal arm to pass out therefrom. Said springs will hold the housing open while the signal arm is in its signalling position and when the signal arm is returned to its inoperative position again within the housing the collar 36 will engage the arms 35 and thus automatically close the doors again.

Figure 9:
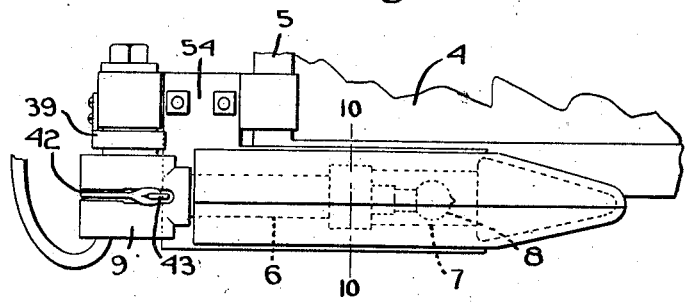
Fig. 9 is a view showing a different embodiment of the invention.
Figure 10:
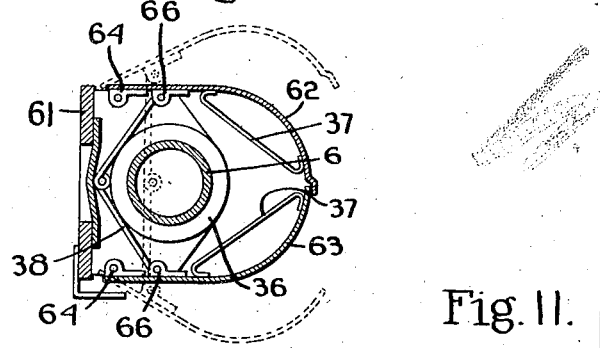
Fig. 10 is an enlarged section on the line 10—10, Fig. 9.

In Figs. 9 and 10 I have shown a different construction of housing which comprises a back 61 and two swinging doors 62 and 63 pivoted to the back at 64. In this embodiment the doors 62 and 63 are opened by the movement of the signal arm 6 instead of by springs and for this purpose each of said doors is provided with a cam member 37 with which the collar 36 engages as the signal arm starts to swing from its inoperative to its operative position, said collar having a camming action on the cam member 37 and thus opening the doors into the dotted line position Fig. 10. For holding the doors open while the signal arm is in its signalling position I have provided a toggle lever device 38 which is pivoted to the doors as shown at 66 so that as the doors are opened the toggle lever device becomes straightened as shown in dotted lines Fig. 10. This toggle lever thus holds the door open while the signal arm is in its signalling position. When the signal arm is swung back into its inoperative position the collar 36 strikes the toggle lever 38 thus breaking it and allowing the doors to close again.

In both embodiments of my invention the housing is capable of opening and closing and is automatically opened when the signal arm is moved from its inoperative position and is automatically closed when the signal arm is returned to its inoperative position.

In the construction shown in Figs. 1 to 5 the housing 27 not only encloses the signal arm but also encloses the hub 9 and where this construction is employed I propose to make the end 49 of the housing movable so that it can be swung into open position to permit the signal arm to swing through 180° necessary to carry it into its signalling position. The end 49 is shown as pivoted to the body of the housing at 50 and I will preferably provide a construction whereby said end is swung into its open position by the swinging movement of the signal arm. In Fig. 5 the housing end 49 has a link 51 pivoted thereto at 52, said link being also connected to the end of the lever 43 so that as the lever is swung in the direction of the arrow Fig. 5 to carry the signal arm into its operative position, such movement acts through the link 51 to swing the housing end 49 into its dotted line position.

Figure 4:
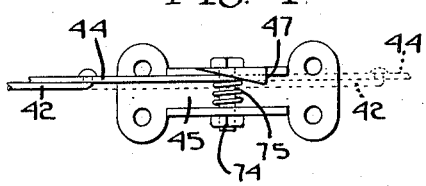
Fig. 4 is a view showing a device for holding the signal in operative position.

In the construction shown in Figs. 4 and 5 the pintles 12 on which the hub 10 is pivoted are loosely mounted in recesses formed in the top and bottom of the hub, the outer ends of the pintles being received in apertures formed in the arms 11. In this construction too the top 28 and bottom 30 of the housing 27 provide means for retaining the pintles in place. The outer end of each pintle is reduced in diameter as shown at 53 thereby forming a shoulder 54 on the pintle. The pintle is of such a length that the shoulder 54 comes flush with the outer face of the arms 11 while the portion 53 projects beyond said face. The top and bottom of the housing are provided with apertures to receive the projections 53 and the engagement of the housing with the shoulder 54 holds the pintles in place. The engagement of the ends 53 of the pintles with the housing also serves to hold the housing in place.

If it is desired to remove the signal arm the top and bottom of the housing may be sprung out of engagement with the ends 53 of the pintle thus enabling the housing to be removed and when this is done the pintles can be removed from the arms thus freeing the hub.

In the construction shown in Figs. 7 and 8 the housing covers the arm only but does not cover the hub and the latter is pivotally hung from a suitable bracket 54 secured to the wind shield post.

Figure 12:
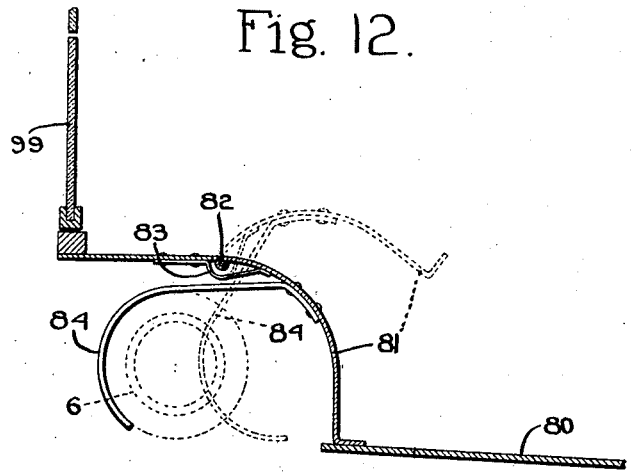
Figs. 12, 13 and 14 are views showing the housing for the signal arm built into the car.
Figure 13:
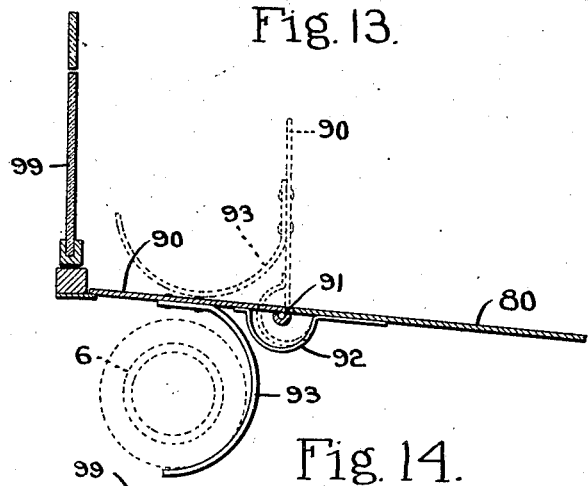
Figure 14:
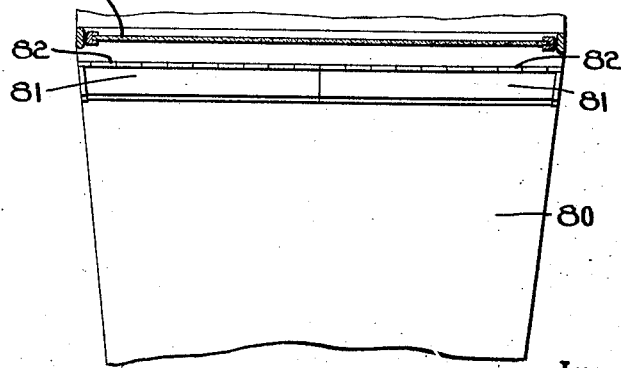

In Figs. 12, 13 and 14 I have shown a different construction where the housing is built into the car body. In the construction shown in Fig. 12 the housing is built into the car body directly in front of the wind shield 99 and between the latter and the engine hood 80. The car body is formed with an opening at this point adapted to be closed by a closure 81 which is pivoted at 82 and is acted on by a suitable spring 83 tending normally to open the closure. This closure 81 has an arm 84 thereon which is engaged by the signal arm when the latter is in its inoperative position, said arm thereby holding the housing closed. When the signal arm is swung into its operative position the spring 83 operates to automatically open the closure 81 thus allowing the signal to pass out from the housing and to be swung into its operative position. The housing will remain open while the signal arm is in signalling position but when the signal arm swing back into inoperative position again it will engage the arm 84 and thus close the door 81 of the housing. The construction show in Fig. 12 is adapted for a signal arm which swings in a horizontal plane and about a vertical axis.

In Fig. 13 I have shown another construction adapted for a signal which is designed to swing in a vertical plane and about a horizontal axis from its inoperative to its operative position. In this embodiment the car body directly in front of the wind shield is formed with an opening which is closed by the door 90, said door being hinged at 91 and being acted on by a spring 92 which tends to open it. This door is also provided with an arm 93 adapted to be engaged by the signal arm 6 when the latter is in inoperative position thereby to hold the door closed. This construction is such as to require the signal arm to move out of the housing in a vertical direction and, therefore, requires that the signal arm should be pivoted to turn about a horizontal axis.

So far as the present invention is concerned the swinging arm 6 may or may not be illuminated. In Fig. 5 I have shown a construction similar to that illustrated in my above-mentioned co-pending application Ser. No. 464,541 by which the circuit to the bulb 8 is normally opened but is automatically closed when the cord 42 is put under strain for the purpose of swinging the signal into its operative position. The arm 43 is connected to the hub 9 through a spring connection 55 and it extends out through a slot 76 formed in the hub. This arm carries a contact 56 which is connected to a circuit wire 57 leading to the battery and which is adapted to be brought into engagement with another contact 58 situated within the hub when a pulling strain is applied to the flexible connection 42. The contact 58 is connected to the bulb 8 through a circuit 59.

From the above it will be seen that I have provided a signal device comprising a swinging signal arm and a housing having an opening through which the signal arm may enter it and also having means for closing the opening.

It will also be observed that my invention comprehends means whereby when the signal arm is swung from its inoperative to its signalling position the closure will be opened to permit the signal to pass out from the housing and will remain open while the signal is in its signalling position. The invention also comprehends means whereby the housing is closed when the signal arm is swung back in its inoperative position within the housing.

Some advantages which are gained from this construction is that the signal will be entirely protected when it is not being used and the opening of the housing to permit the signal to pass out therefrom produces a movement in addition to that of the signal arm itself so that there are two movements to catch the attention of the observer, one caused by the opening of the housing and the other of the signal arm.

I claim—

1. In a vehicle signal, the combination with a signal arm, of means for pivotally supporting said arm on a vehicle so that it can be swung into either operative or inoperative position, a housing for the signal arm in which it is received when in inoperative position, the pivotal support for the arm being located at one end of the housing and the latter having an opening extending from one end to the other thereof through which said arm passes in leaving or entering the housing, a closure for said opening separate from the signal arm and pivoted to the housing to swing about an axis parallel to the plane in which the signal arm swings, and means for opening the closure automatically as the signal arm swings into operative position and for closing said closure when the signal arm swings into inoperative position.

2. In a vehicle signal, the combination with a signal arm, of means for pivotally supporting said arm on a vehicle so that it can be swung into either operative or inoperative position, a housing for the signal arm in which it is received when in inoperative position, the pivotal support for the arm being located at one end of the housing and the latter having an opening extending from one end to the other thereof through which said arm passes in leaving or entering the housing, a closure for said opening pivoted to the housing to swing about an axis parallel to that of the housing, a spring acting on said closure tending normally to open it, and an arm extending from the closure and which is engaged by the signal arm when the latter is within the housing thereby to maintain the closure closed.

3. In a vehicle signal, the combination with a signal arm, of means for pivotally supporting said arm on a vehicle so that it can swing into either operative or inoperative position, a housing in which the arm is received when in inoperative position, the pivotal support for the arm being situated within the housing at one end thereof and said housing having an opening extending from one end to the other thereof through which the arm passes in leaving and returning to the housing, a closure for said opening pivoted to turn about an axis parallel to the housing axis, the end of the housing adjacent the pivotal support for the arm being also pivotally mounted, and means for opening the closure and said end of the housing when the signal arm is swung into operative position and for closing said closure and housing end when the arm is swung into inoperative position within the housing.

4. In a vehicle signal, the combination with a signal arm, of means for pivotally supporting said arm on a vehicle so that it can swing into either operative or inoperative position, a housing in which the arm is received when in inoperative position, the pivotal support for the arm being situated within the housing at one end thereof and said housing having an opening extending from one end to the other thereof through which the arm passes in leaving and returning to the housing, a closure for said opening pivoted to turn about an axis parallel to the housing axis, the end of the housing adjacent the pivotal support for the arm being also pivotally mounted, a spring acting on the closure tending normally to open it, an arm extending from the closure and arranged to be engaged by the signal arm when the latter is within the housing thereby to hold the closure closed, and a link connection between the signal arm and the housing end by which the latter is opened and closed when the signal arm is swung into its operative or inoperative position.

5. In a vehicle signal, the combination with a signal arm, of a holder to which said arm is pivotally supported, and a clamping device for clamping the holder to a wind shield post, said clamping device comprising clamping arms adapted to engage said post and a U-shaped spring connecting said arms and by which they are made to yieldingly clamp the post.

In testimony whereof, I have signed my name to this specification.

CALEB D. PAGE.